US009188276B2

(12) United States Patent  
Klein

(10) Patent No.: US 9,188,276 B2  
(45) Date of Patent: Nov. 17, 2015

(54) MAGNETIC MOUNTING SYSTEM

(75) Inventor: David L. Klein, Shaker Heights, OH (US)

(73) Assignee: Metal & Cable Corp., Inc., Twinsburg, OH (US)

( * ) Notice: Subject to any disclaimer, the term of this patent is extended or adjusted under 35 U.S.C. 154(b) by 612 days.

(21) Appl. No.: 13/157,881

(22) Filed: Jun. 10, 2011

(65) Prior Publication Data  
US 2011/0304519 A1 Dec. 15, 2011

Related U.S. Application Data

(60) Provisional application No. 61/353,423, filed on Jun. 10, 2010.

(51) Int. Cl.
| | |
|---|---|
| H01Q 1/12 | (2006.01) |
| F16M 11/20 | (2006.01) |
| F16M 11/12 | (2006.01) |
| F16M 11/36 | (2006.01) |
| F16M 13/02 | (2006.01) |
| H01F 7/02 | (2006.01) |

(52) U.S. Cl.  
CPC ............ F16M 11/20 (2013.01); F16M 11/126 (2013.01); F16M 11/36 (2013.01); F16M 13/022 (2013.01); H01Q 1/125 (2013.01); H01Q 1/1242 (2013.01); F16M 2200/08 (2013.01); H01F 7/0252 (2013.01)

(58) Field of Classification Search  
CPC ..... F16M 11/126; F16M 11/20; F16M 11/36; F16M 13/022; F16M 2200/08; H01F 7/0252; H01Q 1/1242; H01Q 1/125

USPC ................................ 343/890; 248/309.4, 310  
See application file for complete search history.

(56) References Cited

U.S. PATENT DOCUMENTS

| | | | |
|---|---|---|---|
| 1,319,481 | A | 10/1919 | Mahon |
| 1,778,481 | A | 10/1930 | Boucher |
| 3,082,982 | A | 3/1963 | Moskowitz |
| 4,543,584 | A | 9/1985 | Leer |
| 4,755,830 | A | 7/1988 | Plunk |
| 5,060,435 | A | 10/1991 | Bogdanow |
| 5,376,722 | A | 12/1994 | Coolbaugh et al. |
| 5,800,291 | A * | 9/1998 | Grover .......................... 473/447 |
| 5,979,844 | A | 11/1999 | Hopkins |
| 6,027,089 | A | 2/2000 | Maharg et al. |
| 6,283,425 | B1 | 9/2001 | Liljevik |
| 7,624,957 | B2 | 12/2009 | Klein |
| 2008/0054136 | A1 | 3/2008 | Gou |

FOREIGN PATENT DOCUMENTS

| | | |
|---|---|---|
| DE | 19903819 | 8/2000 |
| WO | WO 03/047829 | 6/2003 |

* cited by examiner

Primary Examiner — Seung Lee  
(74) Attorney, Agent, or Firm — Fay Sharpe LLP

(57) ABSTRACT

An antenna mounting system comprises a base, a mast extending from the base having a first bore formed through the body of the mast; and a antenna mounting assembly secured to the base having a second bore formed through the body of the antenna mounting assembly. The first and second bored are aligned such that the base and the mast are positionally secured via a pin.

20 Claims, 9 Drawing Sheets

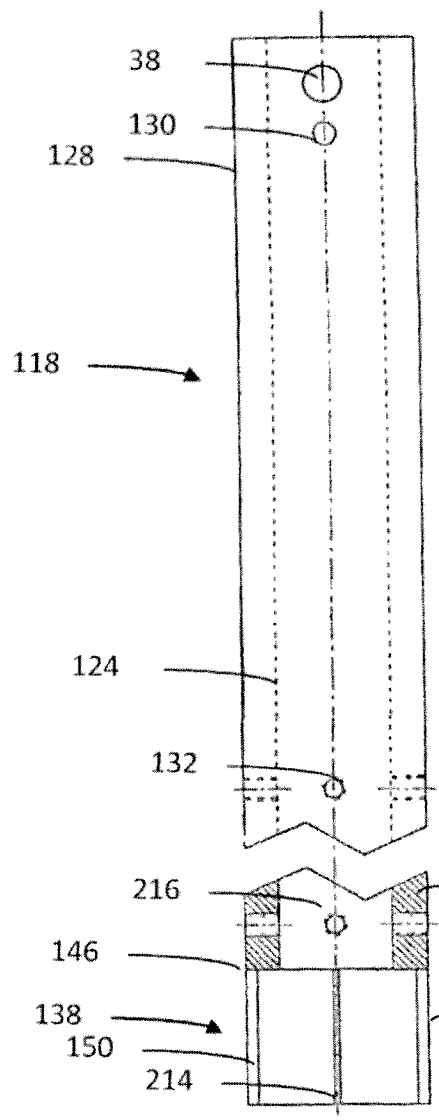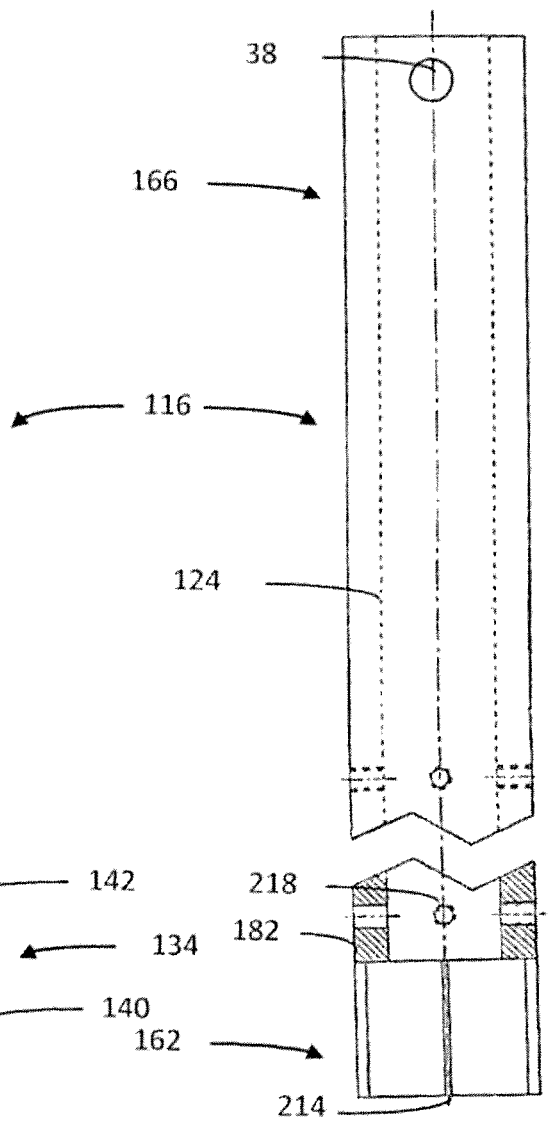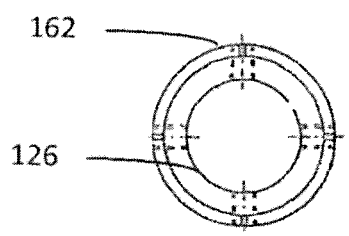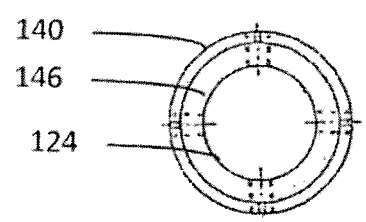
FIG. 11B  FIG. 10B
FIG. 11A  FIG. 10A

MAGNETIC MOUNTING SYSTEM

RELATED APPLICATIONS

This application claims the benefit of and priority to prior U.S. provisional application Ser. No. 61/353,423, filed Jun. 10, 2010, the disclosure of which is incorporated herein in its entirety by reference hereto.

This application is related to commonly owned U.S. Pat. No. 7,624,957, the disclosure of which is expressly incorporated herein by reference.

BACKGROUND OF THE INVENTION

The present disclosure relates to mounting systems, and more particularly, to antenna mounting assemblies. It finds particular application in conjunction with the mounting of antennas and various types of electronic equipment to various types of structures and/or surfaces, and will be described with particular reference thereto. However, it is to be appreciated that the present disclosure is also amenable to other like applications.

In this regard, antenna mounting assemblies are well known and readily utilized, for example, by Amateur Radio operators for mounting antennas on various surfaces. Many of these antenna mounting assemblies consist of a base being secured to a surface. A mast is rigidly secured to the base for mounting an antenna. Typically, the mast is secured to the base by braces, mounting brackets, or the like. A problem exists when such antenna mounting assemblies encounter high wind conditions. Under such conditions movement of the mast as slight as a few degrees causes a significant degradation or loss of the signal being received by the antenna. One who has experimented with conventional antenna mounting assemblies will be aware of still further deficiencies and difficulties that one must confront when utilizing such assemblies in high wind conditions.

In light of the foregoing, it becomes evident that there is a need for an antenna mounting assembly that would provide a solution to one or more of the deficiencies from which the prior art and/or antenna mounting assemblies have suffered. It is still more clear that an antenna mounting assembly providing a solution to each of the needs left unresolved by the prior art while providing a number of heretofore unrealized advantages thereover would represent an advance in the art. Accordingly, it would be desirable to develop an antenna mounting assembly which could support and limit the rotational movement of a load in a high wind condition.

BRIEF DESCRIPTION OF THE INVENTION

In accordance with one aspect of the present disclosure, an antenna mounting system is provided. The antenna mounting system comprises a base, an mast extending from the base has a first bore formed through a body of the mast; and an antenna mounting assembly secured to the base having a second bore formed through a body of the antenna mounting assembly. The first and second bores are aligned such that the base and the mast are positionally secured via a pin.

In accordance with another aspect of the present disclosure, a magnetic mounting system is provided. The magnetic mounting system comprises a plurality of magnets; a base including a plurality of spaced apart mounting apertures; a suspension assembly pivotally securing and suspending each magnet of the plurality of magnets to the base, a mast extending from the base having a first bore formed through a body of the mast; and an antenna mounting assembly secured to the base having a second bore formed through a body of the antenna mounting assembly. The plurality of mounting apertures of the base allow for varying magnetic arrangements of the plurality of magnets thereby allowing the magnet mounting system to be mounted onto an associated convex surface. The first and second bores are aligned such that the base and the mast are positionally secured via a pin.

In accordance with yet another aspect of the present disclosure, a magnetic mounting system for an associated antenna is disclosed. The magnetic mounting system comprises a base; at least one magnet pivotally secured to and spaced from a bottommost surface of the base and adapted to at least partially mount the base to an associated surface; a mast having a first bore formed through the mast extending from the base and adapted to receive and secure a portion of the associated antenna; and an antenna mounting assembly secured to the base having a second bore formed through the antenna mounting assembly. The first and second bores are aligned such that the base and the mast are positionally secured via a pin.

Still other aspects of the invention will become apparent from a reading and understanding of the detailed description of the several embodiments hereinbelow.

BRIEF DESCRIPTION OF THE DRAWINGS

The present invention may take physical form in certain parts and arrangements of parts, several embodiments of which will be described in detail in this specification and illustrated in the accompanying drawings which form a part of the invention.

FIG. 10A is a side elevational view of a first section of an alternate embodiment of a mast of the magnet mounting system of FIG. 1.

FIG. 10B is a top plan view of the first section of the mast of FIG. 10A.

FIG. 11A is a side elevational view of a second section of the alternate embodiment of the mast of the magnet mounting system of FIG. 1.

FIG. 11B is a bottom plan view of the first section of the mast of FIG. 11A.

DETAILED DESCRIPTION OF THE PREFERRED EMBODIMENTS

It should, of course, be understood that the description and drawings herein are merely illustrative and that various modifications and changes can be made in the structures disclosed without departing from the scope and spirit of the invention. Like numerals refer to like parts throughout the several views.

While the present disclosure of an antenna mounting assembly is illustrated as being particularly applicable to the mounting of antennas and various types of electronic equipment to various types of structures and/or surfaces, it should be appreciated that the present invention can be adapted for a wide variety of other types of equipment as well as a wide variety of other uses.

In a preferred embodiment, an antenna mounting system is illustrated which is able to securely mount an antenna to a surface in high wind conditions, as well as limit the rotational movement of the mast and antenna resulting in the elimination of degradation or loss of the signal being transmitted or received by the antenna due to high wind conditions. The antenna mounting system includes an antenna mounting assembly which limits the rotational movement of the mast and secures the mast to the base of the antenna mounting system. Such an antenna mounting system would be particularly advantageous in a mounting system as shown in FIG. 1.

Figure 1:
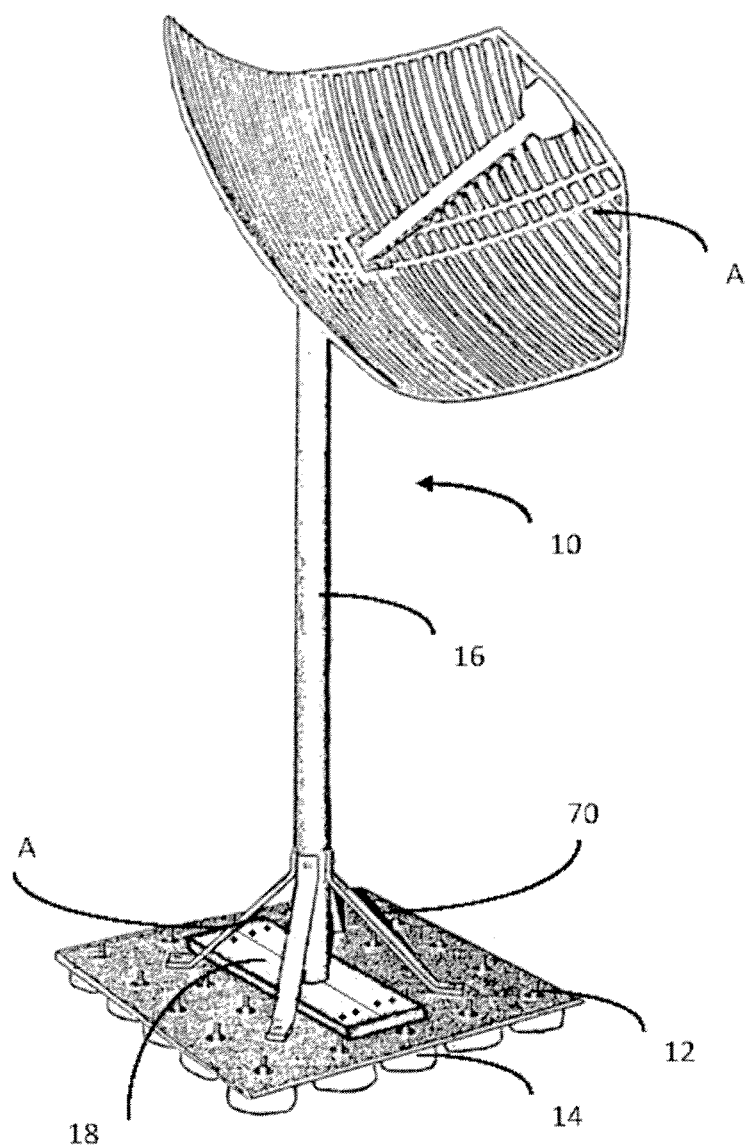
FIG. 1 is a front perspective view illustrating an antenna mounted to a magnet mounting system in accordance with an embodiment of the present invention.

Referring now to the drawings, wherein the drawings illustrate an embodiment of the present invention only and are not intended to limit same, FIG. 1 shows a magnetic mounting system 10 which is designed to mount various types of structures onto flat surfaces, curved surfaces and/or other shaped surfaces. The magnetic mounting system 10 generally comprises a base 12 and a elongated mast 16 extending from the base 12 through a mounting assembly 18 which supports and limits the rotational movement of the mast 16 and a structure such as an antenna A or other type of electrical equipment secured to the mast 16.

The magnetic mounting system further includes at least one magnet 14 suspended from the base 12 for mounting the base 12 to a surface. In this embodiment, a plurality of magnets 14 is suspended from the base. The magnets 14 are generally circular in cross-section; however, it will be appreciated that many other shapes may be used without departing from the scope and intent of the present disclosure. It will also be appreciated that many types of materials can be used to form the magnets 14. Likewise, it will also be understood that many color arrangements can be used for the magnets to obtain a desired look and function of the magnetic mounting system 10 for a particular application.

Figure 2A:
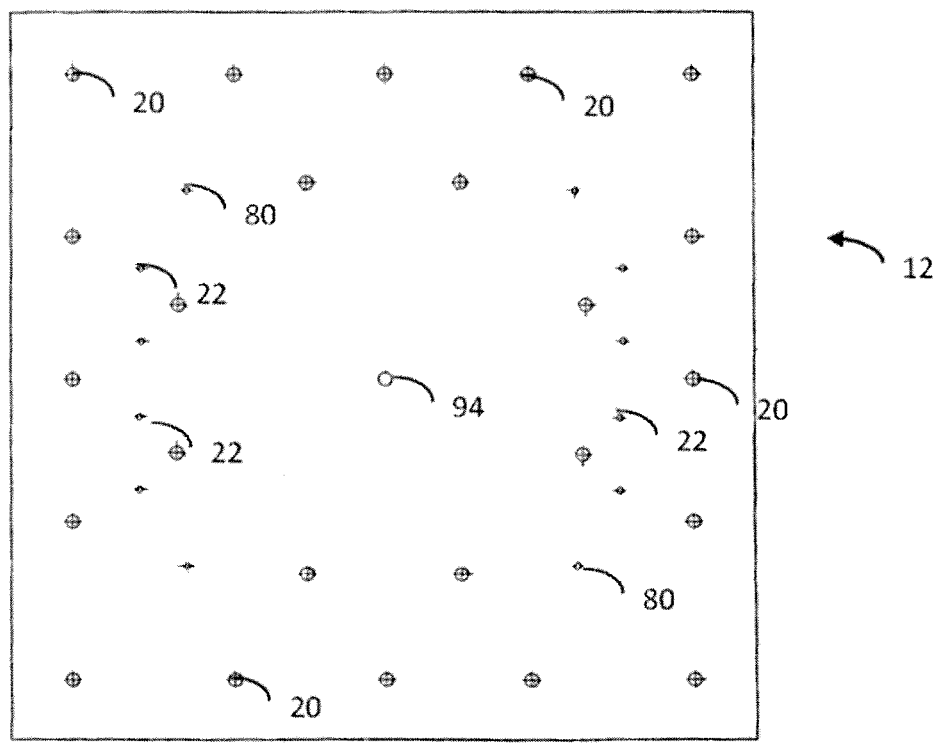
FIG. 2A is a top plan view of a base of the magnet mounting system of FIG. 1.
Figure 2B:
FIG. 2B is a side elevational view of the base of FIG. 2A.
Figure 3A:
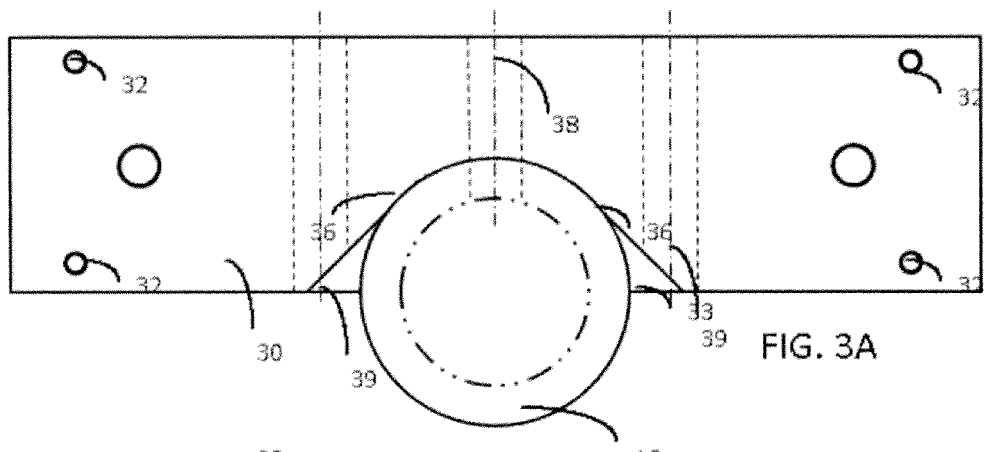
FIGS. 3A and 3B are top plan views of a mounting assembly of the magnet mounting system of FIG. 1.
Figure 3B:
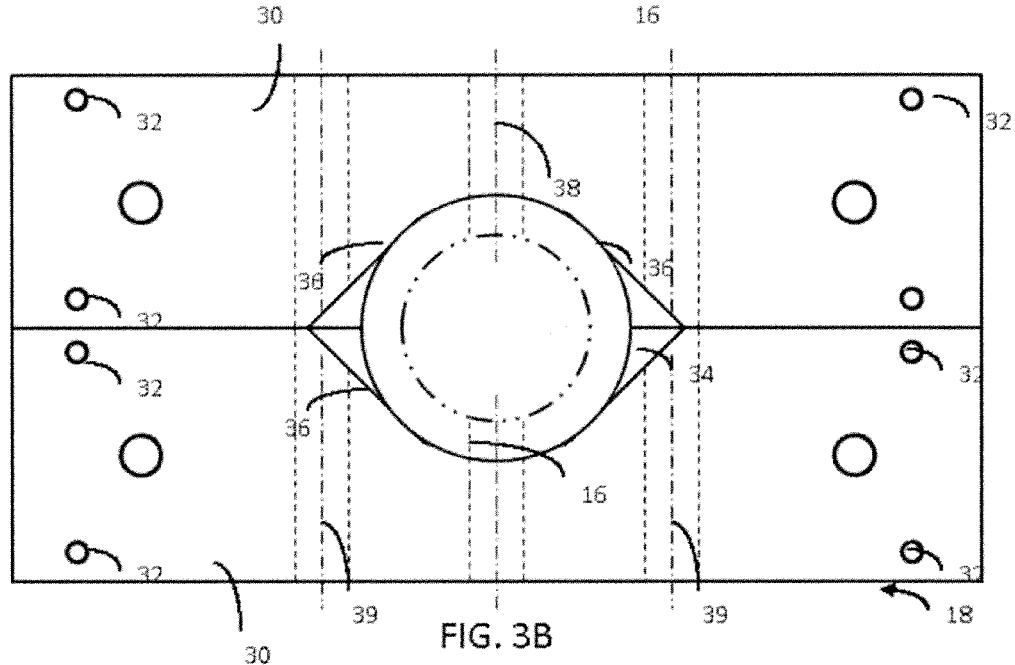
Figure 3C:
FIG. 3C is a side elevational view of the mounting assembly of FIGS. 3A and 3B.
Figure 4:
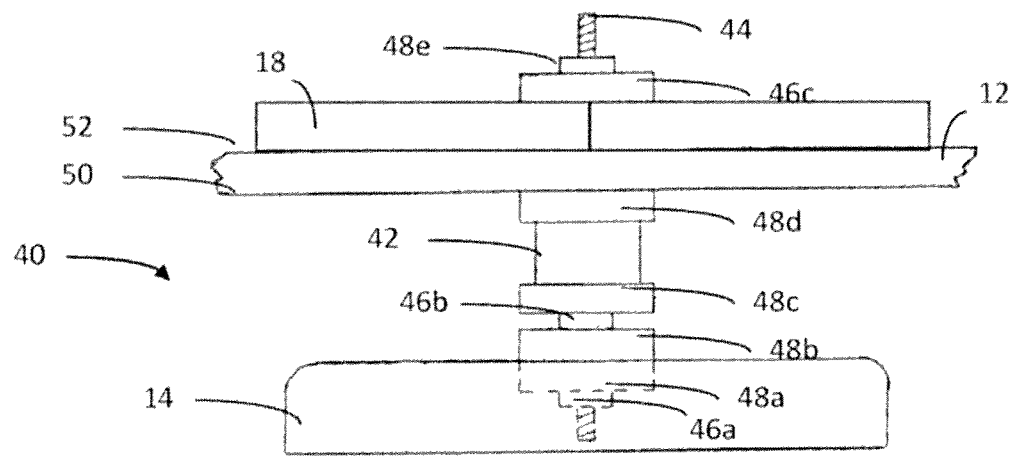
FIG. 4 is an enlarged side elevational view of a suspension assembly of the magnet mounting system of FIG. 1 illustrating a magnet in a first position.
Figure 5:
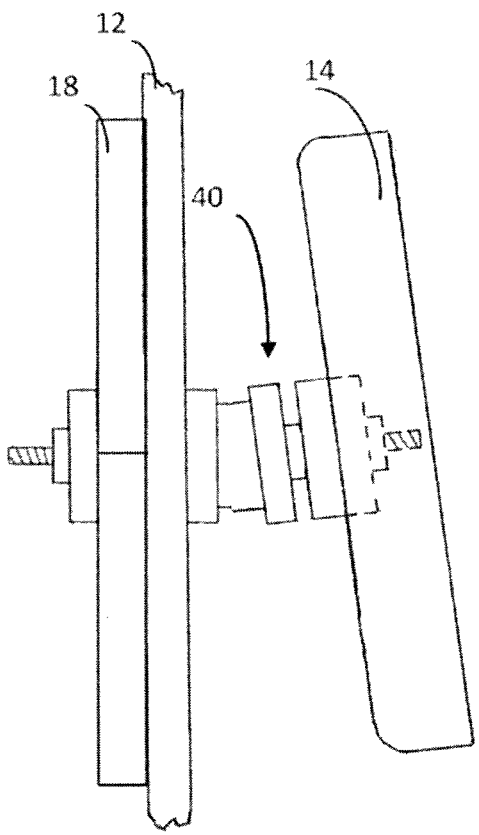
FIG. 5 is an enlarged side elevational view of the suspension assembly of FIG. 4 illustrating a magnet in a second position.

With reference to FIGS. 2A and 2B, the base 12 includes a plurality of spaced apart mounting apertures 20, so that one or more components can be attached thereto. The mounting apertures 20 are adapted to receive a portion of a suspension assembly 40 (FIGS. 4 and 5). The mounting apertures 20 provide a plurality of mounting arrangements for the magnets 14. It will be appreciated that the number of magnets and their secured arrangements to the base 12 will be dependent upon a particular application for the magnetic mounting system 10. The base 12 further includes a plurality of spaced apart assembly apertures 22, so that the mounting assembly 18 can be attached thereto. The assembly apertures 22 are adapted to receive fasteners for securing the mounting assembly 18 (FIGS. 3A, 3B, and 3C). The mounting assembly 18 provides additional longitudinal and circumferential support about a lower, terminal end of the mast and advantageously further limits the rotational movement of the mast 16. It will be appreciated that the configuration of the mounting assembly 18 secured to the base 12 will be dependent upon a particular application for the magnetic mounting system 10. The base 12 and mounting assembly 18 are illustrated as being generally rectangular structures; however, it will be understood that other shapes can be used without departing from the scope and intent of the present invention depending on the structure being mounted thereto and the number of magnets being suspended therefrom.

As set forth above, because many of the mounting locations for the magnetic mounting system 10 could have a convex surface (e.g. water towers), the plurality of magnets 14 are moveable relative to the base 12. Again, if the magnets were held inflexibly to the base, only a small portion of the magnet's potential holding power would be utilized. Therefore, as illustrated in FIG. 5, the suspension assembly 40 moveably secures each magnet 14 of the plurality of magnets 14 to the base 12 allowing each magnet to seat itself to whatever orientation it encounters.

With reference now to FIGS. 3A, 3B, and 30 the mounting assembly 18 preferably comprises two generally planar mounting structures or thick plates 30. However, it is to be appreciated that other designs and/or configurations of the mounting assembly 18 may be used. For example, it is also contemplated that the mounting assembly 18 may be integrated as a single structure or include more mounting structures than illustrated, e.g. more than two. To mount the mounting assembly 18 to the base 12, each mounting structure 30 includes apertures 32 dimensioned to receive a conventional fastener. The apertures 32 align with the assembly apertures 22 located on the base 12 (FIG. 2A). The apertures 32 and the assembly apertures 22 receive a conventional fastener, such as a screw, that extends through the aligned apertures and threadedly engages the assembly apertures 22 or another threaded component such as a nut (not shown). It should also be understood that the manner of mounting the mounting assembly 18 to the base 12 may include other mounting configurations or other suitable mounting techniques such as welding, adhesives, and the like.

As illustrated in FIGS. 3A and 3B, the mounting structures 30 further include respective recesses 33 that together form an opening 34 so that the mast 16 can extend through the mounting assembly 18. To provide support and limit the rotational movement of the mast 16, the opening 34 is shaped so that the mounting structure continuously abuts the mast 16 along a substantial circumferential outer perimeter adjacent a lower end of the mast 16 in order to provide frictional resistance. It will also be understood that the opening 34 may be formed in a variety of shapes so that each mounting structures has at least two points of contacts 36 with the mast 16 and preferably over a substantial perimeter region rather than tangential contact. With continued reference to FIG. 3C, a mounting bore 38, 38' is formed in the each of the mounting structures 30 and the mast 16 in order to reduce the rotational movement of the mast 16. The mounting bore 38, 38' for each of the mounting structures 30 and the mast 16 are formed in alignment with the mounting structures 30 and the mast 16 so that the mounting assembly 18 and the mast 16 may be secured to one another via a pin or a conventional fastener such as a threaded bolt. It will be appreciated that the bore 38' is preferably centrally located (i.e., the bore proceeds through a diametrical region of the mast) and is substantially perpendicular to a longitudinal axis of the mast. The pin/bolt (not shown) provides a secure interconnection among the pair of mounting plates/structures 30 and a lower end of the mast 16. In addition, openings 39 are also provided through each of the mounting structures 30 and align with respective openings 39 in the other mounting structure 30 when assembled to receive respective pins/fasteners (not shown) to secure the mounting structures 30 in gripping engagement about the mast as illustrated in FIG. 3B. As shown, the bore and openings 38, 39 are preferably in substantially parallel arrangement for ease of manufacture and assembly and preferably are substantially perpendicular to the abutting edge of the respective mounting structure 30. One skilled in the art will recognize that these bores/openings 38, 39 may be threaded, may be of the same or different dimensions, adopt select aspects of the mounting arrangements described below, etc. without departing from the scope and intent of the present disclosure. It should also be recognized that although two openings 39 are illustrated, the mounting assembly may include no openings 39 or a different number of openings 39 than illustrated.

With reference now to FIGS. 4 and 5, the suspension assembly 40 includes at least one elastomeric member 42 disposed between the base 12 and the magnet 14. The elastomeric member allows the magnet to pivot relative to the base. Thus, the suspension assembly 40 provides for some movement of the magnet relative to the base to facilitate in the connection of the magnet to a variety of surfaces. The suspension assembly 40 generally includes a stainless steel bolt 44, one or more stainless steel locking nuts 46 and one or more stainless steel washers or plates 48.

With continued reference to FIG. 4, to mount the suspension assembly 40 to the base 12 and the magnet 14, the magnet can be first secured to the bolt. In this regard, a portion of the bolt 44 is extended through an opening (not shown) located on the magnet. A pair of washers 48a, 48b are slid onto the bolt 44 from opposing surfaces of the magnet. A pair of locking nuts 46a, 46b are threaded onto the bolt from opposing ends of the bolt, each nut engaging one of the washers which fixedly secures the magnet between the washers 48a, 48b. Washer 48c is then slid onto the bolt, washer 48c abutting nut 46b. The elastomeric member 42, which can include a neoprene material such as at least one neoprene washer, is then mounted onto the bolt followed by another washer 48d. This subassembly is then secured to a first surface 50 of the base 12. Specifically, a portion of the bolt 44 is extended through one of the mounting apertures 20 of the base 12. The mounting apertures 20 are generally larger than the outer diameter of the bolt 44 which allows the bolt to shift or move in the aperture as the magnet 14 pivots relative to the base 12. Washer 48e is slid onto the bolt 30 from a second surface 52 of the base 12, the base essentially being sandwiched between washers 48d and 48e. Locking nut 46c is then threaded onto the bolt and engages washer 48e.

It should be appreciated that the amount of movement of the magnet 14 relative to the base 12 can also depend on the compression rate of the elastomeric member 42 which, in turn, can depend on the spacing between the base and the magnet. As such, it will be understood that the farther the locking nut 46c is threaded onto the bolt, the more the elastomeric member becomes compressed between washers 48c and 48d. As the elastomeric member becomes compressed, the compression rate of the elastomeric member will increase thereby limiting the pivotal movement of the magnet 14. Thus, the suspension assembly 40 allows the user of the magnetic mounting system 10 to control the pivotal movement of each magnet depending on the type of surface the magnetic mounting system is to be mounted onto.

FIGS. 4 and 5 illustrate a certain arrangement for the components of the suspension assembly 40 to moveably mount the elastomeric member 42 between the base 12 and the magnet 14; however, this arrangement is not limiting and may include a modified or different arrangement and more or fewer components. For example, the opening of the magnet can have a diameter smaller than the locking nuts 46. In this embodiment, washers 48a and 48b may be eliminated. In addition the elastomeric member 42 can be bonded to one of the base, magnet and washer. In this embodiment, the number of washers and locking nuts may be reduced. It will be also appreciated that other and/or additional materials can be used for the suspension system.

Figure 6B:
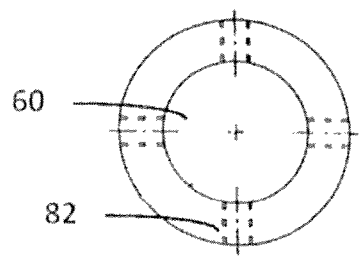
FIG. 6B is a bottom plan view of the mast of FIG. 6A.
Figure 6A:
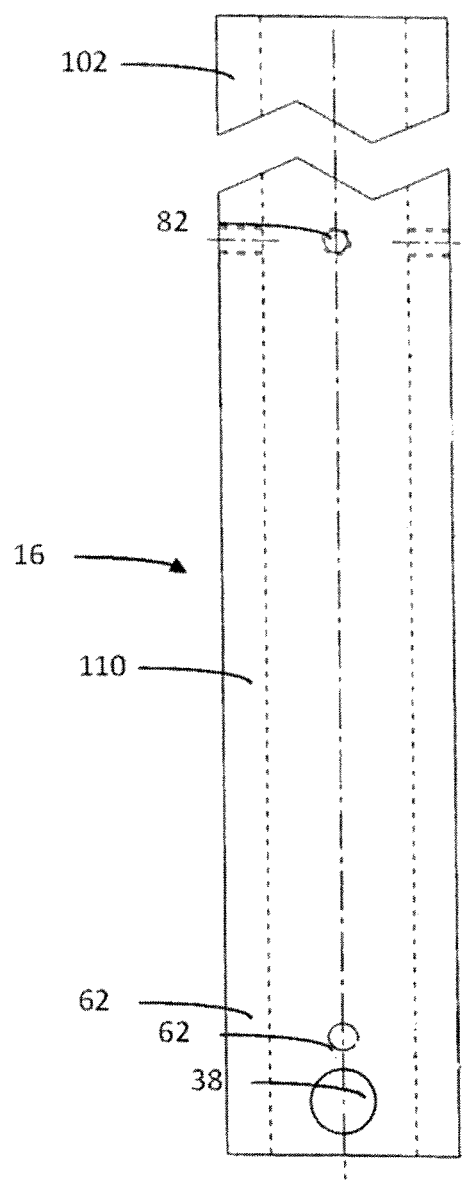
FIG. 6A is a side elevational view of one embodiment of a mast of the magnet mounting system of FIG. 1.

With reference now to FIGS. 6A and 6B, the mast 16, which, in one form, extends from the base 12 to support a structure such as the antenna A, is illustrated as being generally cylindrical in cross-section. However, it is to be appreciated that other conformation can be used, such as rectangular. The mast 16 includes a through bore 60 which reduces the overall weight of the mast and allows for easy installation and mounting of structures to the mast. A first end portion 62 of the mast includes a weep hole 64 which allows any water trapped in to bore 60 to escape. The first end portion 62 of the mast further includes the mounting bore 38' which is configured so that the mast and mounting assembly 30 may be secured to one another via a pin or conventional fastener as described previously.

Figures 7A, 7B:
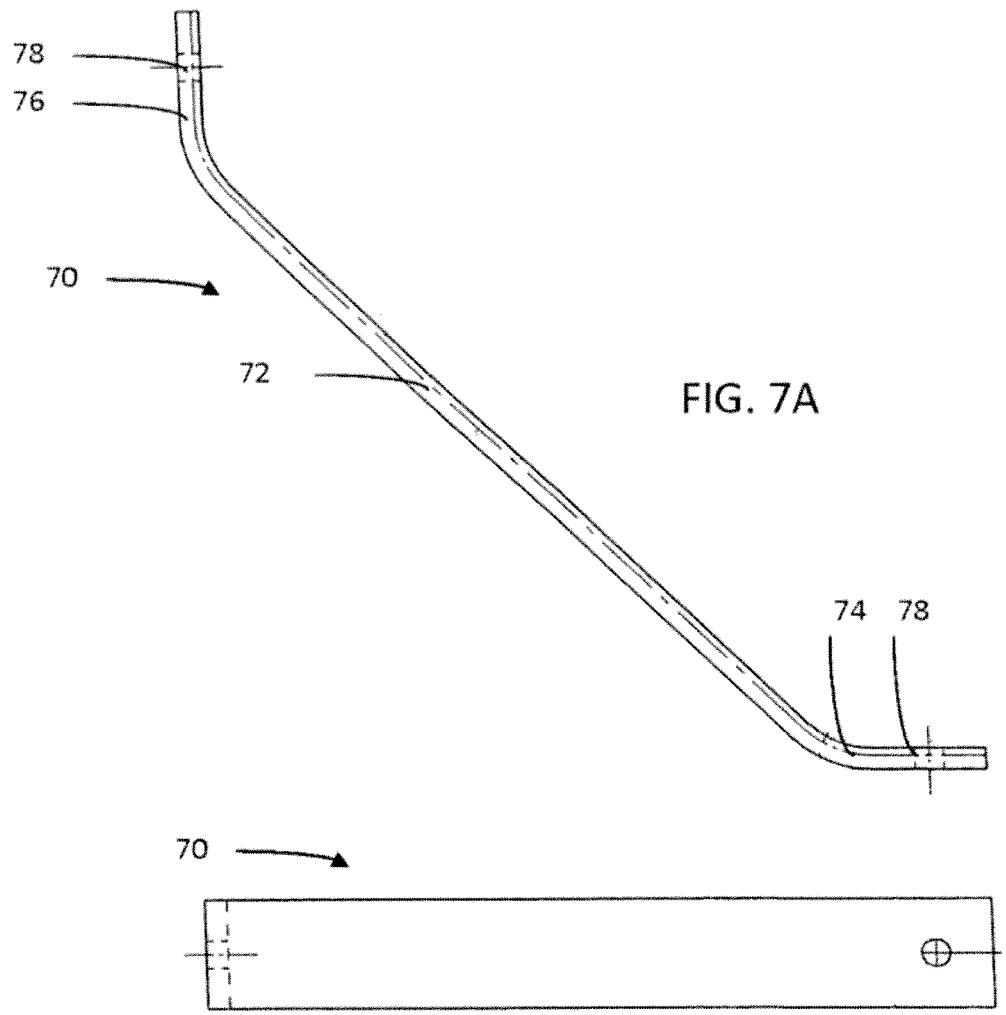
FIG. 7A is a side elevational view of a brace of the magnet mounting system of FIG. 1.
FIG. 7B is a bottom plan view of the brace of FIG. 7A.

With reference again to FIG. 1, in this embodiment, the mast 16 is mounted to the center the base 12 by at least one brace 70. Although four braces 70 are illustrated, more or less braces may be used depending on the type of structure being mounted to the mast. The braces 70 and the mounting assembly 18 are used in combination with the base 12 and the mast 16 to rigidly secure the mast 16 onto the base 12. As illustrated in FIGS. 7A and 7B, the brace 70 includes a generally planar central structure 72 and first and second flared flanges 74 and 76, respectively, extending outwardly from opposing end portions of the central structure 72. However, it is to be appreciated that other designs of the central structure and flanges can be used. To mount the braces 70 to the base 12 and the mast 16, each flange includes an aperture 78 dimensioned to receive a conventional fastener. The apertures 78 align with apertures 80 located on the base 12 (FIG. 2A) and apertures 82 located adjacent the first end portion 62 of the mast 16 (FIG. 6A). The apertures 80 and 82 are threaded so that a conventional fastener, such as a screw, extends through one of the apertures 78 and threadedly engages one of the apertures 80 and 82.

Figures 8A, 8B:
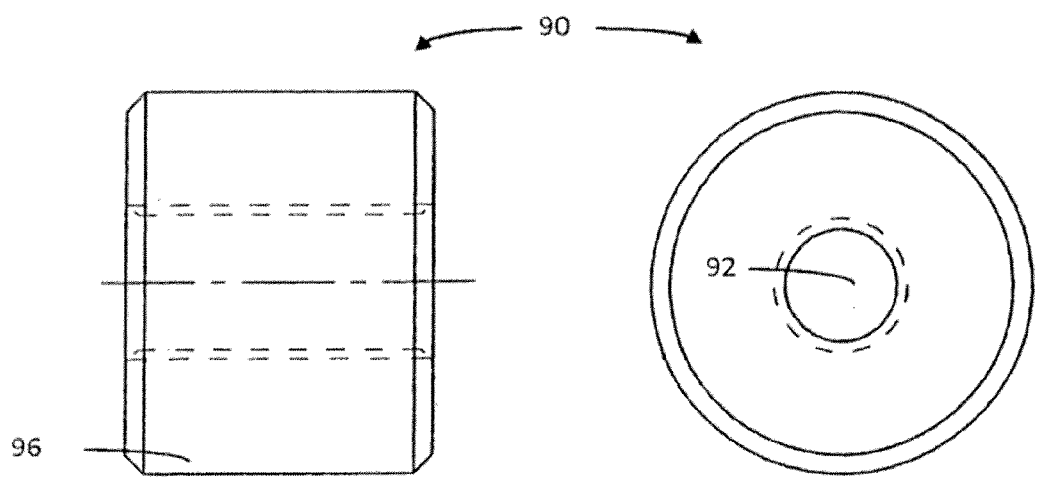
FIG. 8A is a side elevational view of a plug of the magnet mounting system of FIG. 1.
FIG. 8B is a top plan view of the plug of FIG. 8A.

It should be appreciated that the mast 16 may be mounted to the base 12 in other and/or additional manners. Moreover, a plug 90, as illustrated in FIGS. 8A and 8B, can be secured to the base 12 to further prevent the mast 16 from moving in high winds off of dead center of the base. The plug 90 includes an opening 92 which registers with an opening 94 (FIG. 2A) located on the base 12. In this embodiment, the opening 94 extends through the center of the base 12; although, it will be understood that the opening 94 can be located elsewhere on the base 12 without departing from the scope and intent of the present invention. To mount the plug 90 to the base 12, the plug is positioned on the base so that opening 92 aligns with opening 94. At least one of the openings 92, 94 can be threaded so that a conventional fastener, such as a screw, can extend through the opening 94 from the first surface 50 of the base and threadedly engage the opening 92. The mast 16 is then mounted over the plug 90. More particularly, the plug 90 has an outer diameter slightly smaller than the diameter of the bore 60 of the mast 16. The mast 16 is inserted about the plug, an outer surface 96 of the plug being spaced from the bore. Again, it will be appreciated that the braces 70 can be used without the plug 90 to rigidly secure the mast to the base.

Figures 9A, 9B:
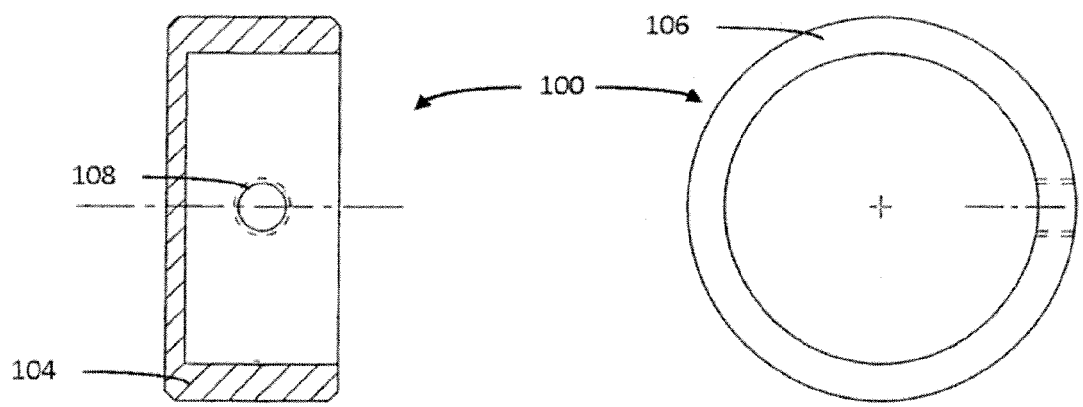
FIG. 9A is a side cross-sectional view of a cap of the magnet mounting system of FIG. 1.
FIG. 9B is a top plan view of the cap of FIG. 9A.

With reference now to FIGS. 9A and 9B, a cap 100 can be used to cover a second end portion 102 of the mast 16 to prevent water and debris from entering into the bore 60 of the mast. The cap includes a top wall 104 and a flange 106 extending outwardly from the top wall. An inner diameter of the flange is slightly larger than the outer diameter of the mast 16 such that second end of the mast can be covered by the flange. The flange includes a threaded opening 108 for receiving a conventional fastener, such as a bolt. As the fastener is being threaded through the opening, an end of the fastener will engage an outer surface 110 of the mast 16 securing the cap 100 to the mast.

Because most of the mounting locations for the magnetic mounting system 10 will not be in a proper direction for aiming the antenna A or other electrical equipment, an alternate embodiment of a mast 116 is illustrated in FIGS. 10A-11B. The mast 116 is generally cylindrical in cross-section and includes a first section 118 pivotally connected to a second section 120. Each section includes a through bore 124 and 126 which reduces the overall weight of the mast and allows for easy installation and mounting of structures to the mast.

As shown in FIGS. 10A and 10B and similar to mast 16, a first end portion 128 of the first section 118 includes a weep hole 130 which allows any water trapped in to bore 124 to escape and threaded apertures 132 for mounting the braces 50 to the mast 116. The first end portion 128 further includes a mounting bore 38 which is configured so that the mast 116 and mounting assembly 18 may be secured to one another via a pin or conventional fastener. A second end portion 134 of the first section 118 includes an axially extending flange 138. The flange 138 has an inner diameter larger than the diameter of the bore 124 and an outer surface 140 contiguous with an outer surface 142 of the first section 118 thus forming a radial shelf 146 between a wall 148 of the bore and an inner wall 150 of the flange.

With reference to FIGS. 11A and 11B, a first end portion 160 of the second section 120 also includes a radially extending flange 162 similar to the radial flange 138 described above. A second end portion 166 of the second section 120 can be covered by the cap 80 to prevent water and debris from entering into the bore 126.

Figure 14:
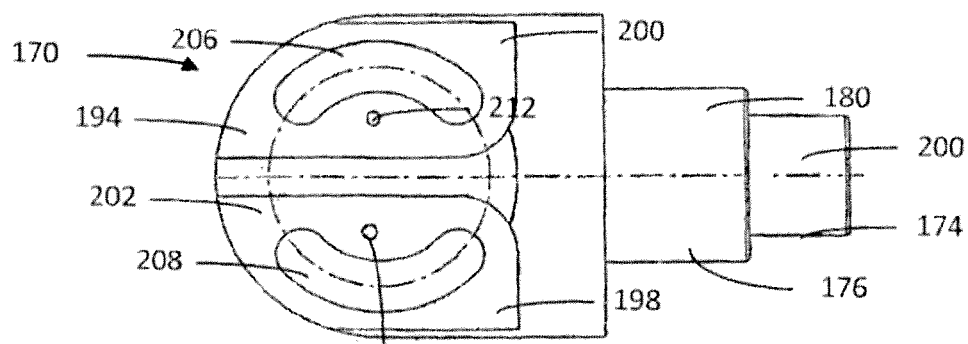
FIG. 14 is a top plane view of the elbow of FIG. 12.
Figure 12:
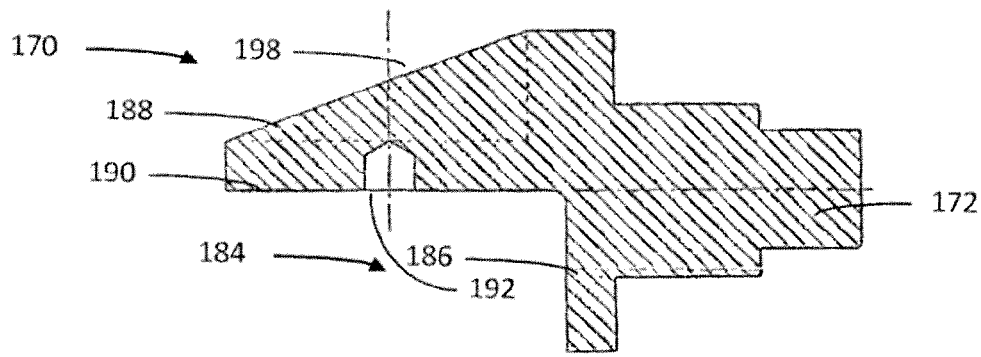
FIG. 12 is a cross-sectional view of an elbow for the alternate embodiment of the mast.
Figure 13:
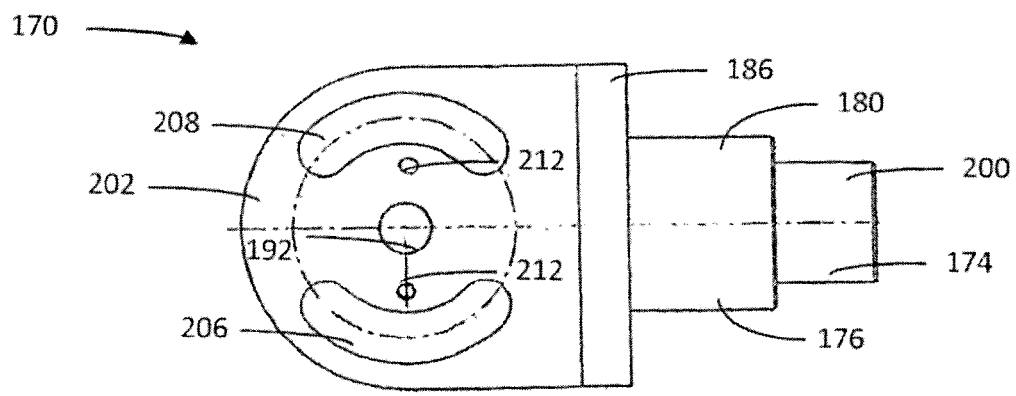
FIG. 13 is a bottom plane view of the elbow of FIG. 12.

With reference now to FIGS. 12-14, the first and second sections 118, 120 of the mast 116 are pivotally connected by a pair of adjustable hinges or elbows 170. The elbow includes a shank 172 having a first section 174 and a second section 176. The first section 174 has an outer diameter slightly smaller than the diameter of each bore 124, 126. The second section 174 has an outer diameter slightly smaller than the inner diameter of each flange 138, 162. Thus, the shank 172 can be slidingly received in each section 118, 120 of the mast 116. Once positioned, a wall 180 of the shank 172 will abut each radial shelf 146 and 182 of the respective first and second sections 118, 120.

The elbow 170 further includes a generally T-shaped plate 184 attached to the shank 172. The plate 184 includes a first section 186 and a second section 188 extending generally normal from the first section. The second section 188 of the plate 184 includes a first wall 190 offset from a center axis of the shank, the first wall having an aperture 192 dimensioned to receive a conventional dowel pin or pivot pin (not shown). Extending from a second wall 194 of the second section 188 is a pair of reinforcing members or gussets 198, 200 which provides additional stability against deflecting forces and maintains the generally perpendicular relationship between the plate 184 and the shank 172. As shown in FIGS. 13 and 14, an end 202 of the second section 188 has a generally arcuate contour.

With continued reference to FIGS. 13 and 14, the second section 188 of the plate 184 includes a pair of opposing arcuate slots 206 and 208. As will be described in greater detail below, the arcuate slots allow the pair of elbows to be rotatably mounted to each other. The arcuate slots are dimensioned to receive conventional fastening means such as a bolt.

To assemble the first section 118 of the mast 116 to the second section 120 of the mast 116, the pair of elbows 170 are first rotatably mounted to each other. An end of the dowel pin (not shown) is inserted in the aperture 192 of the first elbow and an opposing end of the dowel pin is inserted in the aperture 192 of the second elbow. The first elbow 170 is then positioned in the second end portion 134 of the first section 118 and the second elbow 170 is positioned in the first end portion 160 of the second section 120. Conventional bolts are then slid through the arcuate slots 206 and 208. The elbows 170 will allow a structure, such as the antenna A, mounted to the second section 120 of the mast 116 to be aimed at a target anywhere in the X, Y, and Z directions above a plane of the base 12. Once the antenna is properly positioned, the elbows are fixed to each other by threading nuts onto the bolts extending through the arcuate slots and threading conventional set screws (not shown) through openings 212 extending through the second section 188 adjacent the arcuate slots 206 and 208. To assist in the fixing of the elbows 170, each flange 138, 162 can include a slot 214 (FIGS. 10A, 11A) dimensioned for an adjustable clamp (not shown) which can hold the position of the elbows prior to insertion of the set screws. The elbows 170 are also fixed to the end portions 134, 160 by threading a conventional fastener, such as a screw or bolt, into respective threaded openings 216 and 218 located on the end portions 134, 160 (FIGS. 10A, 11A). As the fastener is being threaded through the openings, an end of the fastener will engage an outer surface 220 of the second section 174 of the shank 172 securing the elbows 170 to the mast 116.

The base, mounting assembly, mast, braces, plug and cap are preferably aluminum, but is should be noted that other metals, such as stainless steel, composites or other similar materials may be used. Likewise, the conformation of the mast may relate to any shape other than the generally cylindrical shape, such as rectangular, square, triangular, or any other shape depending on the size and requirements needed for the end use of the magnetic mounting system. It should be appreciated that the shape of the plug, the cap and the shank of the elbow is dependent on the conformation of the mast. Similarly, the mast is shown as being located at or near the center point of the base, although that could be varied. Likewise, although it is preferred to use 300 grade stainless steel components (bolt, nut and washer) for the suspension assembly, occasionally other materials of construction may be used without departing from the scope and intent of the invention.

The present invention provides an antenna mounting assembly wherein the mounting force of the assembly prevents the mast 16 from rotational moving in high winds off of dead center of the base in a 140-MPH as well as securing the mast to the base of the antenna mounting system through use of the antenna mounting assembly.

The present disclosure has been described with reference to the illustrated embodiment. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A mounting structure comprising:
   a base;
   a mast extending from the base, the mast having a first bore formed through a body of the mast; and
   a mounting assembly secured to the base having a second bore formed through a body of the mounting assembly, wherein the mounting assembly includes two generally planar mounting structures configured and positioned to continuously abut the mast along a substantially circumferential outer perimeter of a terminal end of the mast to provide frictional resistance to limit rotational movement of the mast;
   wherein the first and second bores are aligned such that the base and mast are positionally secured via a pin;
   wherein the pin provides a secure interconnection between the mounting structures to secure the mounting structures in a gripping engagement about the mast.

2. The mounting system according to claim 1, wherein each mounting structures include one or more apertures which align with one or more assembly apertures located on the base.

3. The mounting system according to claim 2, wherein the one or more apertures and one or more assembly apertures receive conventional fasteners to secure the mounting assembly to the base.

4. The mounting system according to claim 1, wherein each of the mounting structures include respective recesses.

5. The mounting system according to claim 4, wherein the recesses of each of the mounting structures form an opening such that the mast can extend through the mounting assembly.

6. The mounting system according to claim 5, wherein the opening is shaped such that the mounting structure continuously abuts the mast along the substantial circumferential outer perimeter at the terminal end of the mast.

7. The mounting system according to claim 1, wherein the mounting structures include at least two points of contact with the mast.

8. The mounting system according to claim 1, wherein the first bore is centrally located and is substantially perpendicular to a longitudinal axis of the mast.

9. The magnetic mounting system according to claim 1, wherein the mounting structures are mounted adjacent to the base.

10. A magnetic mounting system comprising:
    a plurality of magnets;
    a base including a plurality of spaced apart mounting apertures;
    a suspension assembly pivotally securing and suspending each magnet of the plurality of magnets to the base;
    a mast extending from the base having a first bore formed through a body of the mast;
    one or more braces rigidly securing the mast to the base; and
    a mounting assembly secured to the base having a second bore formed through a body of the mounting assembly, the mounting assembly including two generally planar mounting structures configured and positioned to continuously abut the mast along a substantially circumferential outer perimeter of a terminal end of the mast to provide frictional resistance to limit rotational movement of the mast;
    wherein the plurality of mounting apertures of the base allow for varying magnetic arrangements of the plurality of magnets and the first and second bores are aligned such that the base and mast are positionally secured via a pin.

11. The magnetic mounting system according to claim 10, wherein the two generally planar mounting structures are mounted adjacent to the base.

12. The magnetic mounting system according to claim 11, wherein each of the mounting structures include respective recesses.

13. The magnetic mounting system according to claim 12, wherein the recesses of each of the mounting structures form an opening such that the mast can extend through the mounting assembly.

14. The magnetic mounting system according to claim 13, wherein the opening is shaped such that the mounting structure continuously abuts the mast along the substantial circumferential outer perimeter at the terminal end of the mast.

15. The magnetic mounting system according to claim 10, wherein the one or more braces each include a generally planar section and first and second flared flanges extending from opposing end portions of the planar section, the first and second flanges being secured to base and mast.

16. A magnetic mounting system for an associated antenna comprising:
    a base;
    at least one magnet pivotally secured to and spaced from a bottommost surface of the base and adapted to at least partially mount the base to an associated surface;
    a mast extending from the base and adapted to receive and secure a portion of the associated antenna, the mast having a first bored formed through a body of the mast; and
    a mounting assembly secured to the base having a second bore formed through a body of the mounting assembly, the mounting assembly including general planar mounting structures configured and positioned to continuously abut the mast along a substantially circumferential outer perimeter of a terminal end of the mast to provide frictional resistance to limit rotational movement of the mast;
    wherein the first and second bores are aligned such that the base and mast are positionally secured via a pin which provides a secure interconnection between the mounting structures to secure the mounting structures in a gripping engagement about the mast.

17. The magnetic mounting system according to claim 16, wherein the two generally planar mounting structures are mounted adjacent to the base.

18. The magnetic mounting system according to claim 17, wherein each of the mounting structures include respective recesses.

19. The magnetic mounting system according to claim 18, wherein the recesses of each of the mounting structures form an opening such that the mast can extend through the mounting assembly.

20. The magnetic mounting system according to claim 19, wherein the opening is shaped such that the mounting structure continuously abuts the mast along the substantial circumferential outer perimeter at a terminal end of the mast.

* * * * *